(No Model.) 2 Sheets—Sheet 1.
M. E. PERRING.
FEEDER FOR THRASHING AND OTHER MACHINES.
No. 336,153. Patented Feb. 16, 1886.
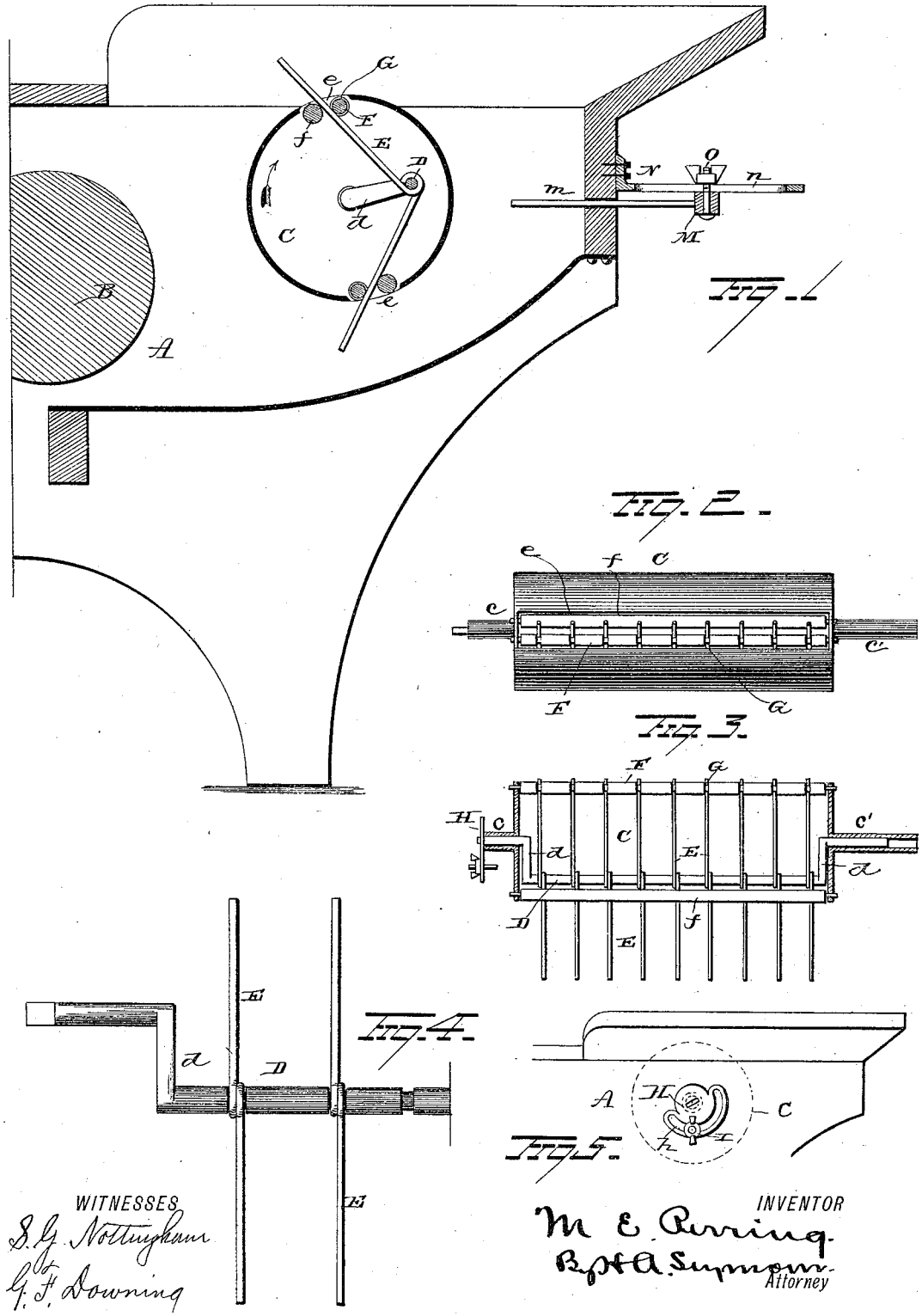
WITNESSES
INVENTOR (No Model.)    M. E. PERRING.    2 Sheets—Sheet 2.

FEEDER FOR THRASHING AND OTHER MACHINES.

No. 336,153.    Patented Feb. 16, 1886.

WITNESSES
S. G. Nottingham
G. F. Downing

INVENTOR
M E Perring
B. A. Seymour
Attorney

UNITED STATES PATENT OFFICE.

MERRICK E. PERRING, OF BERRIEN SPRINGS, MICHIGAN.

FEEDER FOR THRASHING AND OTHER MACHINES.

SPECIFICATION forming part of Letters Patent No. 336,153, dated February 16, 1886.

Application filed September 4, 1885. Serial No. 176,149. (No model.)

*To all whom it may concern:*

Be it known that I, MERRICK E. PERRING, of Berrien Springs, in the county of Berrien and State of Michigan, have invented certain new and useful Improvements in Feeders for Thrashing and other Machines; and I do hereby declare the following to be a full, clear, and exact description of the invention, such as will enable others skilled in the art to which it appertains to make and use the same.

My invention relates to an improved feeder for thrashing and other machines. It has particular reference to the feed mechanism, and is adapted to clover-hullers and thrashing-machines. It is equally well adapted to handling straw or anything of like character through the body of a thrashing-machine after said straw has passed the thrashing-cylinder, and as a means of thoroughly separating the grain from the straw. By placing a number of my cylinders in succession in the place of beaters or pickers, they will excel all other means of separating the grain from the straw in instances where the straw is damp and hard to thrash.

As machines with which my invention may be combined with great advantage for feeding or handling straw or hay in its various forms vary so much in their construction, I can only give a general rule for combining the same with other machines.

My invention consists in certain features of construction and combinations of parts, as will be hereinafter described, and pointed out in the claims.

Figure 6:
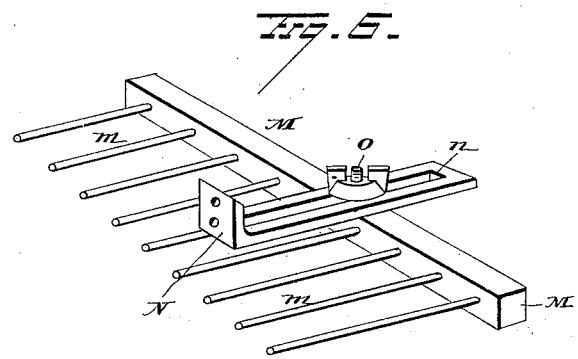
Figure 7:
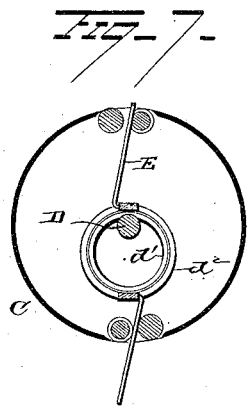
Figure 8:
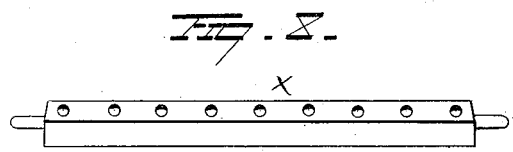

In the accompanying drawings, Figure 1 is a longitudinal vertical section of a portion of a clover-huller embodying my invention. Fig. 2 is a detached view of the improved feed-cylinder. Fig. 3 is a longitudinal section of the feed-cylinder through the feed-rakes. Fig. 4 is a detached view of the rake-shaft with feed-rakes attached. Fig. 5 shows the regulator in position. Fig. 6 is a detached view of the cut-off. Fig. 7 shows a modified form of the feed-rake shaft, and Fig. 8 shows a modified form of finger bar or guide.

A represents a box frame, of suitable size and shape to support the several cylinders in their positions and form a suitable guide for the hay or grain to the thrashing-cylinder B.

C represents the feed-cylinder. It consists, preferably, of a hollow sheet-metal casting, journaled in the frame A at the bottom of the feed-hopper, by means of a pair of hollow trunnions, $c$ $c'$. The feed-rake shaft D is mounted at each end within the hollow trunnions $c$ $c'$, and is cranked within the cylinder, as shown at $d$, the cranked portion extending the entire length of the cylinder-chamber.

Upon the cranked portion $d$ of the shaft D are loosely secured one or more, preferably two, sets of rake-teeth, E. The free ends of the sets of teeth E extend outwardly through diametrically-opposite narrow slots $e$, formed in the cylinder-casing parallel with its axis. A pair of anti-friction rollers, F $f$, are journaled in the ends of the cylinder-casing, and are located a short distance apart, one at each edge of the slot $e$. One of these rollers, F, is provided with a series of annular grooves G, adapted to form guides for the teeth E, and the other roller, $f$, is smooth-faced, and adapted to hold the teeth in position on the roller F. The rollers F $f$ being free to rotate, the bearing of the teeth against them will not produce sliding friction and the consequent rapid wear of both teeth and guides; but the rollers will turn as the teeth bear against them, and the wear upon them will be very slight. In cases where the work is light and the sliding friction between the teeth and their guides therefore but slight, I find it less expensive and more satisfactory to use a perforated guide-bar, X, (shown in Fig. 8,) the same being adapted to hold the teeth in their proper positions against springing when taking hold of the straw, as is liable to occur when a continuous slit is employed. The shaft D, when the machine is in operation, is not allowed to rotate, except for adjustment, as will hereinafter appear. The cylinder C is provided with a suitable pulley or gear-wheel (not shown) secured on one of its trunnions, by means of which it is rotated at the proper speed. One end of the shaft D projects through the end of the hollow trunnion, and is flattened to receive the regulator H. The latter consists of a sector provided with an elongated circular slot, $h$, near its circumference, and with a perforation at its center, by means of which it is firmly secured on the flattened end of the shaft D. A set-screw, I, extends through the slot $h$ into a suitable perforation in the main frame A, and serves to lock the regulator in the desired rotary adjustment. The object is to secure the cranked portion $d$ of the shaft D in such position within the cylinder C that the teeth will project beyond the surface of the casing as they reach the feed side of the hopper, reaching their outer limit of projection either when they first come in contact with the hay or grain, or at a lesser or greater distance after said point of contact, as shall be determined by the regulator. In any case the ends of the teeth will be withdrawn flush with or within the surface of the cylinder at the moment when they rise from the face of the thrasher-cylinder. The different degrees of projection which the teeth have at the moment when they come in contact with the hay or grain determines the amount of hay or grain which shall be fed during each revolution of the feed-cylinder. It will thus be seen that by turning the regulator to the right or left the feed may be regulated with the greatest precision, and that the withdrawal of the teeth within the casing as they leave the thrashing-cylinder prevents any of the hay or straw from catching or winding on the cylinder.

It often occurs, particularly in feeding clover which has been stacked, that the stalks will be matted together in hard bunches, which, if fed to the cylinder in this shape, will prevent the thorough separation of the seed from the stalk. To obviate this I provide a cut-off consisting of a series of teeth or fingers, $m$, secured to a cross-head, M, and adapted to slide horizontally in and out through the end of the cylinder-supporting frame, toward and away from the face of the cylinder. The teeth of the feed-cylinder, catching the straw above the fingers $m$, will thoroughly tear it apart in drawing it through between said fingers, and thus present it to the thrashing-cylinder in a thoroughly separated state.

To hold the cut-off M $m$ in the desired horizontal adjustment, I provide the bracket N, which is adapted to be secured to the framework by screws, bolts, or other suitable means, and is provided with an elongated slot, $n$, through which a clamp-screw, O, extends and enters the cross-head M. By means of the said clamp-screw the head M, and hence the fingers $m$, may be locked in the desired horizontal adjustment, and the feed-throat be thereby enlarged or contracted, as found expedient.

In the modified form of feed-rake shaft represented in Fig. 7 the shaft D is provided with a pair of eccentric wheels, $d'$, one secured thereon at each end of the cylinder, and the ends of the feed-rake head are provided with hollow bearings $d^2$, adapted to loosely embrace the eccentric wheels $d'$. The principle of the eccentric bearings $d^2$ and their effect upon the series of rake-teeth are quite similar to that of the crank $d$ hereinbefore described.

It is evident that a regulator of other form than the one shown might be employed to lock the shaft in different rotary adjustments, and that slight changes might be resorted to in the form and arrangement of the several parts described without departing from the spirit and scope of my invention; hence I do not wish to limit myself strictly to the construction herein set forth; but, Having fully described my invention, what I claim as new, and desire to secure by Letters Patent, is—

1. The combination, with the revolving feed-cylinder, a shaft journaled in the ends of said cylinder, and a series of rake-teeth mounted on said shaft eccentrically to the axis of the cylinder, and adapted to project through slots in the face of the cylinder, of a series of cut-off fingers secured to the cylinder-frame in horizontal adjustment.

2. The combination, with a revolving feed-cylinder having oblong slots in the face thereof, of a crank-shaft journaled at the centers of the ends of the cylinder, a regulator secured to said shaft and adapted to lock it against movement, and a series of cut-off fingers, substantially as set forth.

3. The combination, with the stationary shaft, the rake-teeth eccentrically mounted thereon, and the cylinder adapted to revolve about the shaft, of a pair of anti-friction rollers journaled in the ends of the cylinder near the periphery thereof, and adapted to guide the teeth in their reciprocating motion, substantially as set forth.

4. The combination, with the stationary shaft, the rake-teeth eccentrically mounted thereon, and the cylinder adapted to revolve about the shaft, of a grooved anti-friction roller and a smooth anti-friction roller, said rollers being journaled in the ends of the cylinder near the periphery thereof, and adapted to loosely embrace the opposite sides of a set of rake-teeth, substantially as set forth.

5. The combination, with the stationary crank-shaft, and means for locking it in different rotary adjustments, the revolving cylinder, and two sets of rake-teeth loosely mounted on the crank-shaft, of a pair of anti-friction rollers adapted to embrace the opposite sides of each set of teeth, substantially as set forth.

6. The combination, with a revolving cylinder and sets of feed-teeth adapted to advance and recede through slots in the face of the cylinder, of the set of cut-off fingers and the slotted bracket and clamp-screw adapted to lock the cut-off fingers in the desired horizontal adjustments, for the purpose substantially as set forth.

7. The combination, with a shaft and a cylinder mounted thereon, of guides located within slots in the face of the cylinder, and journaled in the ends of said cylinder, and teeth mounted on the shaft eccentrically to the axis of the cylinder and passing through the guide, substantially as set forth.

In testimony whereof I have signed this specification in the presence of two subscribing witnesses.

MERRICK E. PERRING.

Witnesses:
B. F. PENNELL,
M. C. PENNELL.